United States Patent
Chen et al.

(10) Patent No.: US 9,484,999 B2
(45) Date of Patent: Nov. 1, 2016

(54) METHOD AND DEVICE FOR TRANSMITTING SIGNAL

(71) Applicant: HUAWEI TECHNOLOGIES CO., LTD., Shenzhen (CN)

(72) Inventors: Zhi Chen, Shenzhen (CN); Junjie Zeng, Shenzhen (CN); Lingxiang Li, Shenzhen (CN); Yi Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 14/297,022

(22) Filed: Jun. 5, 2014

(65) Prior Publication Data

US 2014/0307664 A1   Oct. 16, 2014

Related U.S. Application Data

(63) Continuation of application No. PCT/CN2012/085899, filed on Dec. 5, 2012.

(30) Foreign Application Priority Data

Dec. 5, 2011  (CN) .......................... 2011 1 0398042

(51) Int. Cl.
  *H04B 7/06*  (2006.01)
  *H04B 7/04*  (2006.01)

(52) U.S. Cl.
  CPC .......... *H04B 7/0617* (2013.01); *H04B 7/0456* (2013.01)

(58) Field of Classification Search
  None
  See application file for complete search history.

(56) References Cited

U.S. PATENT DOCUMENTS

| | | | |
|---|---|---|---|
| 8,121,079 B2* | 2/2012 | Geng | H04B 7/022 370/329 |
| 8,180,314 B2* | 5/2012 | Kim | H04B 7/04 375/260 |
| 8,515,359 B2* | 8/2013 | Lin | H04B 7/0421 375/265 |
| 2002/0172269 A1* | 11/2002 | Xu | H04L 1/02 375/211 |
| 2005/0249151 A1 | 11/2005 | Takano | |
| 2007/0218950 A1* | 9/2007 | Codreanu | H04W 52/146 455/562.1 |
| 2008/0181170 A1 | 7/2008 | Branlund et al. | |
| 2009/0016460 A1* | 1/2009 | Hwang | H04B 7/0417 375/267 |

(Continued)

FOREIGN PATENT DOCUMENTS

| CN | 1914842 | 2/2007 |
|---|---|---|
| CN | 101771507 A | 7/2010 |

(Continued)

OTHER PUBLICATIONS

Chinese Office Action dated Dec. 25, 2014 in corresponding Chinese Patent Application No. 201110398042.1.

(Continued)

*Primary Examiner* — Eunsook Choi
(74) *Attorney, Agent, or Firm* — Staas & Halsey LLP

(57) ABSTRACT

Embodiments of the present invention provide a method and device for transmitting signal. The method includes: obtaining a downlink beamforming matrix; and using a conjugate transposed matrix of the downlink beamforming matrix as an uplink beamforming matrix for processing uplink signal. In the embodiments of the present invention, the conjugate transposed matrix of the downlink beamforming matrix may be used as the uplink beamforming matrix for processing uplink signal, which can simplify design of the uplink beamforming matrix and thereby reduce complexity of the system.

22 Claims, 4 Drawing Sheets

(56) References Cited

U.S. PATENT DOCUMENTS

| | | | | |
|---|---|---|---|---|
| 2009/0046800 A1* | 2/2009 | Xu | ...................... | H04B 7/0617 375/267 |
| 2011/0273977 A1* | 11/2011 | Shapira | ................ | H04B 7/0452 370/208 |
| 2013/0028243 A1* | 1/2013 | Wentink | ................ | H04L 1/0026 370/338 |
| 2013/0044683 A1* | 2/2013 | Maltsev | ................ | H04B 7/0404 370/328 |

FOREIGN PATENT DOCUMENTS

| | | |
|---|---|---|
| CN | 102075959 | 5/2011 |
| CN | 102104404 A | 6/2011 |
| CN | 102185683 | 9/2011 |
| JP | 2006-121516 | 5/2006 |

OTHER PUBLICATIONS

Chinese Search Report dated Dec. 3, 2014 in corresponding Chinese Patent Application No. 2011103980421.

International Search Report issued on Mar. 14, 2013 in corresponding International Patent Application No. PCT/CN2012/085899.

Sadek, et al., "A Leakage-Based Precoding Scheme for Downlink Multi-User MIMO Channels", IEEE Transactions on Wireless Communications, vol. 6, No. 5, May 2007, p. 1711-1721.

Gomadam, et al., "Approaching the Capacity of Wireless Networks through Distributed Interference Alignment", University of California, Irvine, CA, arXiv:0803.3816v1 [cs.IT], Mar. 26, 2008, p. 1-10.

Extended and Supplementary European Search Report issued on Oct. 24, 2014 in corresponding European Patent Application No. 12856284.0.

International Search Report mailed Mar. 14, 2013, in corresponding International Patent Application No. PCT/CN2012/085899.

* cited by examiner

METHOD AND DEVICE FOR TRANSMITTING SIGNAL

CROSS-REFERENCE TO RELATED APPLICATIONS

This application is a continuation of International Application No. PCT/CN2012/085899, filed on Dec. 5, 2012, which claims priority to Chinese Patent Application No. 201110398042.1, filed on Dec. 5, 2011, both of which are hereby incorporated by reference in their entireties.

TECHNICAL FIELD

Embodiments of the present invention relate to the field of communication technologies, and in particular, to a method and device for transmitting signal.

BACKGROUND

A 3GPP long term evolution-advanced (LTE-A, LTE-Advanced) system uses a relay coordinated transmission method to improve quality of service for users at cell edges and expand the cell coverage. The capacity of a backhaul link of a relay network limits throughput of an access link. Therefore, it is crucial to enhance quality of the backhaul link. In a backhaul link of a relay network having multiple relay stations (Relay), multiple relay stations share the same channel resources, and the multiplexing gain can improve system capacity greatly. However, co-channel interference is inevitable when the multiple relay stations share the same resources.

To cancel co-channel interference, at present, an known solution with optimal capacity is dirty paper coding (DPC, Dirty Paper Coding), but it is difficult to implement the solution due to its high complexity. In addition, a coordinated multi-point transmission/reception (CoMP, Coordinated Multipoint Transmission/Reception) technology attracts wide attention and is researched in the industry in recent years because it can effectively improve performance of users at cell edges and improve system throughput, but the CoMP technology requires coordination between base stations of multiple cells, and there is still a difficulty in actual applications.

SUMMARY

Embodiments of the present invention provide a method and device for transmitting signal, which can simplify design of an uplink beamforming matrix and thereby reduce complexity of a system.

In one aspect, a method for transmitting signal is provided, including: obtaining a downlink beamforming matrix; and using a conjugate transposed matrix of the downlink beamforming matrix as an uplink beamforming matrix for processing uplink signal.

In another aspect, a device for transmitting signal is provided, including: an obtaining module, configured to obtain a downlink transmit beamforming matrix; and a processing module, configured to use a conjugate transposed matrix of the downlink transmit beamforming matrix as an uplink receive beamforming matrix for processing uplink signal.

In another aspect, a device for transmitting signal is provided, including: an obtaining module, configured to obtain a downlink receive beamforming matrix; and a processing module, configured to use a conjugate transposed matrix of the downlink receive beamforming matrix as an uplink transmit beamforming matrix for processing uplink signal.

In the embodiments of the present invention, the conjugate transposed matrix of the downlink beamforming matrix may be used as an uplink beamforming matrix for processing uplink signal, which can simplify design of the uplink beamforming matrix and thereby reduce complexity of the system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
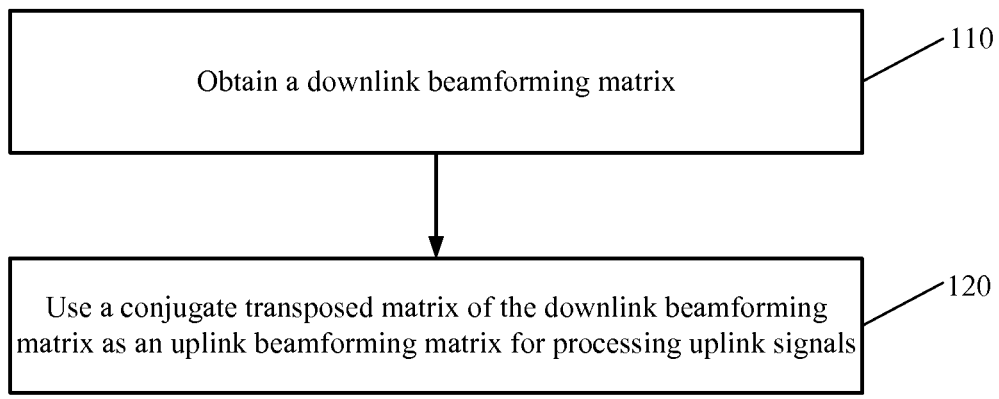
FIG. 1 is a schematic flowchart of a method for transmitting signal according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It should be understood that the technical solutions of the present invention may be applied to various communication systems, for example, a global system of mobile communication (GSM, Global System of Mobile communication) system, a code division multiple access (CDMA, Code Division Multiple Access) system, a wideband code division multiple access (WCDMA, Wideband Code Division Multiple Access) system, a general packet radio service (GPRS, General Packet Radio Service) system, a long term evolution (LTE, Long Term Evolution) system, a long term evolution-advanced (LTE-A, Advanced long term evolution) system, and a universal mobile telecommunication system (UMTS, Universal Mobile Telecommunication System), which is not limited in the embodiments of the present invention. However, for ease of description, the embodiments of the present invention use an LTE network as an example for description.

The embodiments of the present invention may be used in radio networks of different standards. The radio access network in different systems may include different network elements. For example, network elements of the radio access network in the long term evolution (LTE, Long Term Evolution) system and LTE-A system include an eNB (eNodeB, evolved base station), and network elements of the radio access network in the WCDMA (Wideband Code Division Multiple Access, wideband code division multiple access) include an RNC (Radio Network Controller, radio network controller) and a NodeB. Similarly, other radio networks such as a WiMax (Worldwide Interoperability for Microwave Access, worldwide interoperability for microwave access) network may also use solutions similar to those of the embodiments of the present invention, and the only difference is that the related modules in the base station system may be different. No limitation is set in the embodiments of the present invention. However, for ease of description, the following embodiments use an eNodeB as an example for description.

It should also be understood that in the embodiments of the present invention, a terminal may also be referred to as a user equipment (UE, User Equipment), a mobile station (MS, Mobile Station), a mobile terminal (Mobile Terminal), and so on. The terminal may communicate with one or more core networks through a radio access network (RAN, Radio Access Network), for example, the terminal may be a mobile phone (or referred to as a "cellular" phone), a computer having a communication function and so on. For example, the terminal may also be a portable, pocket-sized, handheld, computer built-in, or vehicle mounted mobile apparatus.

In a relay network, one base station and multiple relay stations are placed in each cell. When the base station communicates with a relay station, the communication between the relay station and the base station in the current cell may be affected by interference from the communication between the base station of the current cell and other relay stations of the current cell (intra-cell interference) and interference from the communication between the base stations in other cells and the relay stations in other cells (inter-cell interference). In the traditional mobile communication system, neighboring cells use different frequency bands to suppress inter-cell interference. However, in the LTE and LTE-A systems, an overlapping frequency band may exist between neighboring cells. Therefore, suppression of inter-cell interference is also a critical problem.

To overcome co-channel interference caused by sharing of the same resources by multiple relay stations, for the downlink, on the base station, a beamforming algorithm is already put forward for maximizing the SINR at the relay station, where the solution is simpler than DPC and CoMP. The above beamforming based on the maximized SINR aims to maximize the SINR at the relay station to solve the iterative joint optimization problem of multiple relay stations. In other words, the SINR of a relay station not only depends on the beamforming vector (or referred to as a beamforming matrix) of the relay station, but also is related to beamforming vectors of other relay stations. Therefore, the iterative joint optimization problem of multiple relay stations needs to be considered in the process of solving the optimal beamforming vector, and it is very difficult to solve the optimal beamforming vector.

For the uplink, usually each relay station may use singular value decomposition (SVD, Singular Value Decomposition) to obtain an uplink transmit beamforming matrix to improve the performance of the backhaul link. Specifically, relay station i first measures downlink channel state information (CSIR, Channel State Information of Receive) from the base station to the relay station through cell-specific reference signal (CRS, Cell-specific reference signal), and uses channel reciprocity of a TDD system to obtain the uplink channel state information (CSIT, Channel State Information of Transmit) from the relay station to the base station, which is assumed to be $H_i$. Then, SVD is performed for the channel, and $H_i = U_i \Sigma_i V_i^H$. Finally, the uplink transmit beamforming matrix is determined as $\overline{V}_i = V_i$ and the power allocated to the data stream corresponds to the water-filling allocation performed by a square singular value of the channel matrix. At the receiver, the base station determines an uplink receive beamforming matrix as $\overline{R}_i = U_i$ by using channel information measured through demodulation reference signal (DMRS, Demodulation RS). By matching channels, performance of the relay backhaul link may be improved to some extent. However, design of the beamforming matrix is based on channel matching, that is, advantageous to the direction of wanted signal, but does not consider co-channel interference caused by sharing of the same resources by multiple relay stations.

Therefore, according to the embodiments of the present invention, when a simple uplink beamforming algorithm is designed, the design further considers the problem that the relay station in the backhaul link receives both intra-cell interference and inter-cell interference, so as to improve capacity of the backhaul link.

It should be noted that the embodiments of the present invention are not limited to the relay network, for example, the embodiments of the present invention may also be applied to a scenario of multiple-user multiple-input multiple-output (MU-MIMO, Multiple-User Multiple-Input Multiple-Output) in a cell, and may also be extended to an intra-frequency heterogeneous network having a micro cell.

FIG. 1 is a schematic flowchart of a method for transmitting signal according to an embodiment of the present invention.

110. Obtain a downlink beamforming matrix.

For example, the downlink beamforming matrix may be a downlink transmit beamforming matrix at a base station side, or may be a downlink receive beamforming matrix at a relay station, a user equipment, or a micro base station side.

For example, the downlink beamforming matrix may be obtained based on the beamforming matrix design criterion such as a signal to leakage plus noise ratio (SLNR, Signal to Leakage plus Noise Ratio) or a signal to interference plus noise ratio (SINR, Signal to Interference plus Noise Ratio). The embodiment of the present invention is not limited thereto, for example, the downlink beamforming matrix may be obtained by using the above SVD mode.

120. Use a conjugate transposed matrix (also referred to as a dual matrix) of the downlink beamforming matrix as an uplink beamforming matrix for processing uplink signal.

For example, the base station may use a conjugate transposed matrix of a downlink transmit matrix as an uplink receive beamforming matrix for processing uplink signal received from the relay station, but the relay station, the user equipment, or the micro base station may use a conjugate transposed matrix of the downlink receive beamforming matrix as an uplink transmit beamforming matrix for processing uplink signal to be sent to the base station.

In the embodiment of the present invention, the conjugate transposed matrix of the downlink beamforming matrix may be used as the uplink beamforming matrix for processing uplink signal, which can simplify design of the uplink beamforming matrix and thereby reduce complexity of the system.

In step 120, in the case of duality of a transceiver filter of the first communication device and duality of a transceiver filter of the second communication device, the conjugate transposed matrix of the downlink beamforming matrix is used as the uplink beamforming matrix for processing uplink signal.

Herein the duality of the transceiver filter means that the transmit beamforming matrix and the receive beamforming matrix are in a conjugate transposed relationship. For example, in the case of duality of the transceiver filter of the base station and duality of the transceiver filter of the relay station, the base station may use the conjugate transposed matrix of the downlink transmit beamforming matrix as the uplink receive beamforming matrix for processing uplink signal received from the relay station, or the relay station may use the conjugate transposed matrix of the downlink receive beamforming matrix as the uplink transmit beamforming matrix for processing uplink signal sent to the base station.

Figure 2:
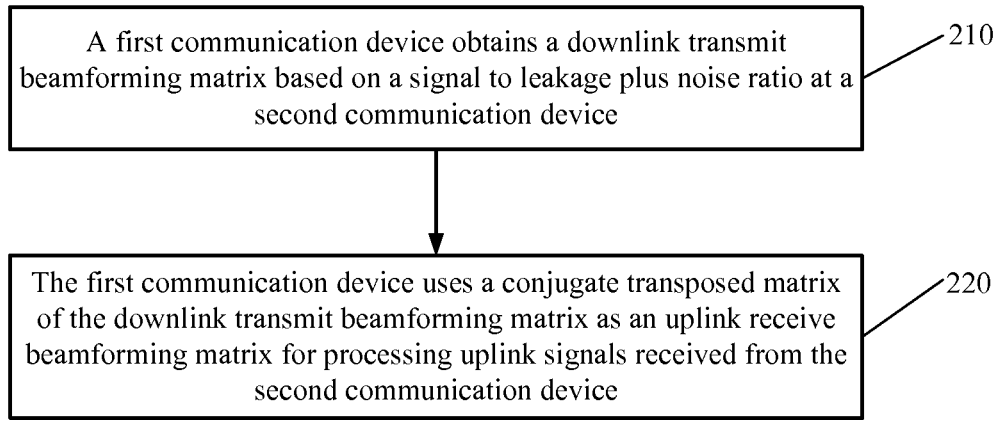
FIG. 2 is a schematic flowchart of a method for transmitting signal according to another embodiment of the present invention.

FIG. 2 is a schematic flowchart of a method for transmitting signal according to another embodiment of the present invention;

210. A first communication device obtains a downlink transmit beamforming matrix based on a signal to leakage plus noise ratio at a second communication device.

According to the embodiment of the present invention, the first communication device may be a macro base station, and the second communication device may be a relay station, a micro base station, or a user terminal.

For example, the above signal to leakage plus noise ratio may refer to a ratio of signal energy sent by the base station of the current cell to a relay station to the sum of signal energy leaked to other relay stations from the signal sent by the base station of the current cell to the relay station and the noise energy at the relay station.

220. The first communication device uses a conjugate transposed matrix of the downlink transmit beamforming matrix as an uplink receive beamforming matrix for processing uplink signal received from the second communication device.

For example, in the design of the downlink transmit beamforming matrix, the base station considers the signal to leakage plus noise ratio at the relay station, and uses the conjugate transposed matrix of the downlink transmit beamforming matrix as the uplink receive beamforming matrix, which is equivalent to considering the signal to interference plus noise ratio at the base station in the design of the uplink receive beamforming matrix (the equivalent relationship will be proved in the subsequent embodiment).

In the embodiment of the present invention, the base station may use the conjugate transposed matrix of the downlink transmit beamforming matrix as the uplink receive beamforming matrix for processing uplink signal, which can simplify design of the uplink receive beamforming matrix and thereby reduce complexity of the system. In addition, in the design of the downlink transmit beamforming matrix, the signal to leakage plus noise ratio at the relay station is considered, which is equivalent to considering the signal to interference plus noise ratio at the base station in the design of the uplink receive beamforming matrix, thereby suppressing intra-cell interference.

In step 210, the first communication device obtains, according to a covariance matrix of an additive white Gaussian noise vector at the second communication device and a channel matrix from the first communication device to the second communication device, a downlink transmit beamforming matrix that maximizes the signal to leakage plus noise ratio at the second communication device.

For example, the second communication device may be at least one relay station. Herein the channel matrix from the first communication device to the second communication device includes the channel matrix from the base station to at least one relay station. The base station may obtain, by maximizing the signal to leakage plus noise ratio at a relay station, the downlink transmit beamforming matrix of the relay station, that is, the base station may maximize the signal to leakage plus noise ratio at the relay station when using the downlink transmit beamforming matrix to send downlink signal to the relay station.

In the embodiment of the present invention, the conjugate transposed matrix of the obtained downlink transmit beamforming matrix that maximizes the signal to leakage plus noise ratio at the relay station is used as the uplink receive beamforming matrix, and since maximizing the signal to leakage plus noise ratio at the relay station is equivalent to maximizing the signal to interference plus noise ratio at the base station, that is, the signal sent by the relay station to the base station suffers minimum interference from other relay stations in the cell, thereby suppressing intra-cell interference.

In step 210, the first communication device may obtain the downlink transmit beamforming matrix through the following formula:

$$\underset{\vec{W}_i \in C^{M \times d}}{\operatorname{argmax}} SLNR = \underset{\vec{W}_i \in C^{M \times d}}{\operatorname{argmax}} \frac{Tr\left(\vec{W}_i^H \vec{H}_i^H \vec{H}_i \vec{W}_i\right)}{Tr\left[\vec{W}_i^H \left(N\sigma_i^2 I + \sum_{j \neq i} \vec{H}_j^H \vec{H}_j\right) \vec{W}_i\right]};$$

where: i is a serial number of the second communication device, and the SLNR is the signal to leakage plus noise ratio at the second communication device; $\vec{W}_i$ is a downlink transmit beamforming matrix to be solved, and $\vec{W}_i \in C^{M \times d}$; $\vec{H}_i$ is a channel matrix from the first communication device to a second communication device i, and $\vec{H}_i \in C^{N \times M}$; $\vec{H}_j$ is a channel matrix from the first communication device to a second communication device j, and $\vec{H}_j \in C^{N \times M}$; $\sigma_i^2$ is a power spectral density of an additive white Gaussian noise of each antenna at the second communication device i, and $\sigma_i^2 I \in C^{M \times M}$; d is the number of data streams sent by the first communication device; M is the number of antennas of the first communication device; and N is the number of antennas of the second communication device i, where i and j are integers.

For example, the base station may first obtain the uplink channel matrix through the DMRS, and then use channel reciprocity of the TDD system to obtain the downlink transmit channel matrix $\vec{H}_i$. For example, actually, because noise power spectrums of the base station and the relay station are consistent, and the values are small, the base station may use $\sigma_i^2$ at the base station as $\sigma_i^2$ at the relay station in the design of a channel matrix. Optionally, the base station may further obtain information of $\sigma_i^2$ at the relay station from the relay station.

In step 210, when d=1, the downlink transmit beamforming matrix is an eigenvector corresponding to the maximum generalized eigenvalue of a matrix pair $$\left\{ \vec{H}_i^H \vec{H}_i, \left( N\sigma_i^2 I + \sum_{j \neq i} \vec{H}_j^H \vec{H}_j \right) \right\};$$

and when d>1, the $\vec{W}_i^o$ is eigenvectors corresponding to first d maximum generalized eigenvalues of the matrix pair $$\left\{ \vec{H}_i^H \vec{H}_i, \left( N\sigma_i^2 I + \sum_{j \neq i} \vec{H}_j^H \vec{H}_j \right) \right\}.$$

In step 220, in the case of duality of a transceiver filter of the first communication device and duality of a transceiver filter of the second communication device, the downlink beamforming matrix is used as the uplink beamforming matrix for processing uplink signal.

For example, in the case of duality of the transceiver filter of the base station and duality of the transceiver filter of the relay station, the base station uses the above conjugate transposed matrix of the downlink transmit beamforming matrix as an uplink receive beamforming matrix for processing uplink signal received from the relay station, so that the criterion of maximizing the SLNR based on which the downlink transmit beamforming matrix is designed is equivalent to the criterion of maximizing the SINR based on which the uplink receive beamforming matrix is designed (not considering the uplink transmit beamforming but considering the uplink transmit beam is a unit matrix), thereby suppressing intra-cell interference.

Figure 3:
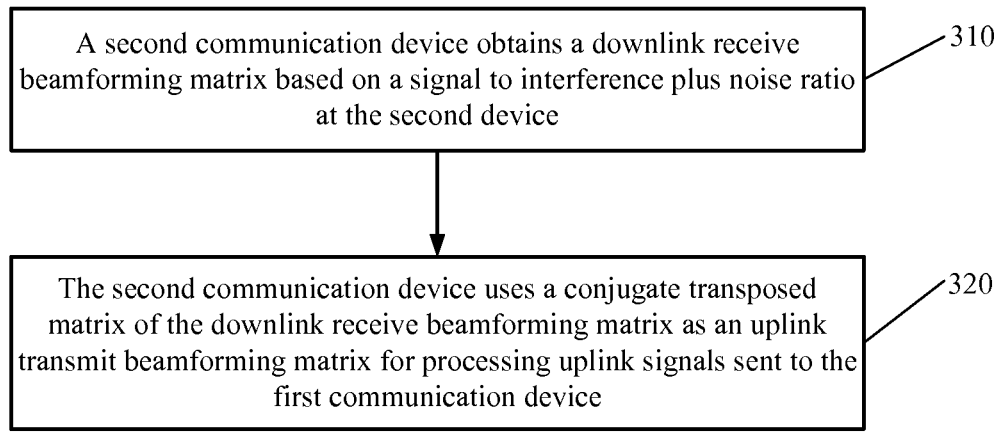
FIG. 3 is a schematic flowchart of a method for transmitting signal according to another embodiment of the present invention.

FIG. 3 is a schematic flowchart of a method for transmitting signal according to another embodiment of the present invention.

310. A second communication device obtains a downlink receive beamforming matrix based on a signal to interference plus noise ratio at the second communication device.

According to the embodiment of the present invention, a first communication device is a macro base station, and the second communication device is a relay station, a micro base station, or a user terminal.

For example, the above signal to interference plus noise ratio may refer to a ratio of wanted signal energy received by a relay station from the base station of the current cell to the sum of interference signal energy received by the relay station from the base stations of other cells and the noise energy at the relay station.

320. The second communication device uses a conjugate transposed matrix of the downlink receive beamforming matrix as an uplink transmit beamforming matrix for processing uplink signal sent to the first communication device.

For example, in the design of the downlink receive beamforming matrix, the relay station considers the signal to interference plus noise ratio at the relay station, and uses the conjugate transposed matrix of the downlink receive beamforming matrix as the uplink transmit beamforming matrix, which is equivalent to considering the signal to leakage plus noise ratio at the base station in the design of the uplink transmit beamforming matrix (the equivalent relationship will be proved in the subsequent embodiment).

In the embodiment of the present invention, the relay station may use the conjugate transposed matrix of the downlink receive beamforming matrix as the uplink transmit beamforming matrix for processing uplink signal, which can simplify design of the uplink transmit beamforming matrix and thereby reduce complexity of the system. In addition, in the design of the downlink receive beamforming matrix, the signal to interference plus noise ratio at the relay station is considered, which is equivalent to considering the signal to leakage plus noise ratio at the base station in the design of the uplink transmit beamforming matrix (this equivalent relationship will be proved in the subsequent embodiment), thereby suppressing inter-cell interference.

In step 310, the second communication device obtains, according to an interference plus noise covariance matrix at the second communication device and an equivalent channel matrix from the first communication device to the second communication device, a downlink receive beamforming matrix that maximizes the signal to interference plus noise ratio at the second communication device.

For example, the second communication device may be at least one relay station. Herein the channel matrix from the first communication device to the second communication device includes the channel matrix from the base station to at least one relay station. The relay station may obtain, by maximizing the signal to interference plus noise ratio at the relay station, the downlink receive beamforming matrix of the relay station, that is, the relay station may maximize the signal to interference plus noise ratio at the relay station when using the downlink receive beamforming matrix to receive downlink signal from the base station.

In the embodiment of the present invention, the conjugate transposed matrix of the obtained downlink receive beamforming matrix that maximizes the signal to interference plus noise ratio at the relay station is used as the uplink transmit beamforming matrix, so that maximizing the signal to interference plus noise ratio at the relay station is equivalent to maximizing the signal to leakage plus noise ratio at the base station, that is, the signal energy leaked to other cells from the signal sent by the relay station to the base station is minimized, thereby suppressing inter-cell interference.

In step 310, the second communication device obtains the downlink receive beamforming matrix through the following formula:

$$\max_{\vec{R}_i} SINR = \max_{\vec{R}_i} \frac{\vec{R}_i \vec{H}_i \vec{W}_i \vec{W}_i^H \vec{H}_i^H \vec{R}_i^H}{\vec{R}_i (\vec{Q}_i + \sigma_i^2 I) \vec{R}_i^H}$$

where: i is a serial number of the second communication device, and the SNR is the signal to interference plus noise ratio at the second communication device; $(\vec{Q}_i + \sigma_i^2 I)$ is the interference plus noise covariance matrix at the second communication device, and $\sigma_i^2 I \in C^{N \times N}$; $\vec{H}_i \vec{W}_i$ is the equivalent channel matrix from the first communication device to the second communication device, $\vec{W}_i \in C^{M \times d}$, and $\vec{H}_i \in C^{N \times M}$; and $\vec{R}_i$ is a downlink receive beamforming matrix to be solved, and $\vec{R}_i \in C^{d \times N}$; M is the number of antennas of the first communication device; and N is the number of antennas of a second communication device i, where i and j are integers.

For example, $(\vec{Q}_i + \sigma_i^2 I)$ may be obtained through cell-specific reference signal, user-specific reference signal may be DM-RSs, and the equivalent channel matrix $\overline{H}_i \overline{W}_i$ is obtained through the user-specific reference signal.

In step 320, in the case of duality of a transceiver filter of the first communication device and duality of a transceiver filter of the second communication device, the downlink beamforming matrix is used as the uplink beamforming matrix for processing uplink signal.

For example, in the case of duality of the transceiver filter of the base station and duality of the transceiver filter of the relay station, the relay station uses the above conjugate transposed matrix of the downlink receive beamforming matrix as an uplink transmit beamforming matrix for processing uplink signal sent to the base station, so that the criterion of maximizing the SINR based on which the downlink receive beamforming matrix is designed is equivalent to the criterion of maximizing the SLNR based on which the uplink transmit beamforming matrix is designed, thereby suppressing inter-cell interference.

It should be understood that the embodiment of FIG. 2 and the embodiment of FIG. 3 are not completely independent, and may be combined for use, where the combination also falls within the scope of the embodiment of the present invention.

Figure 4:
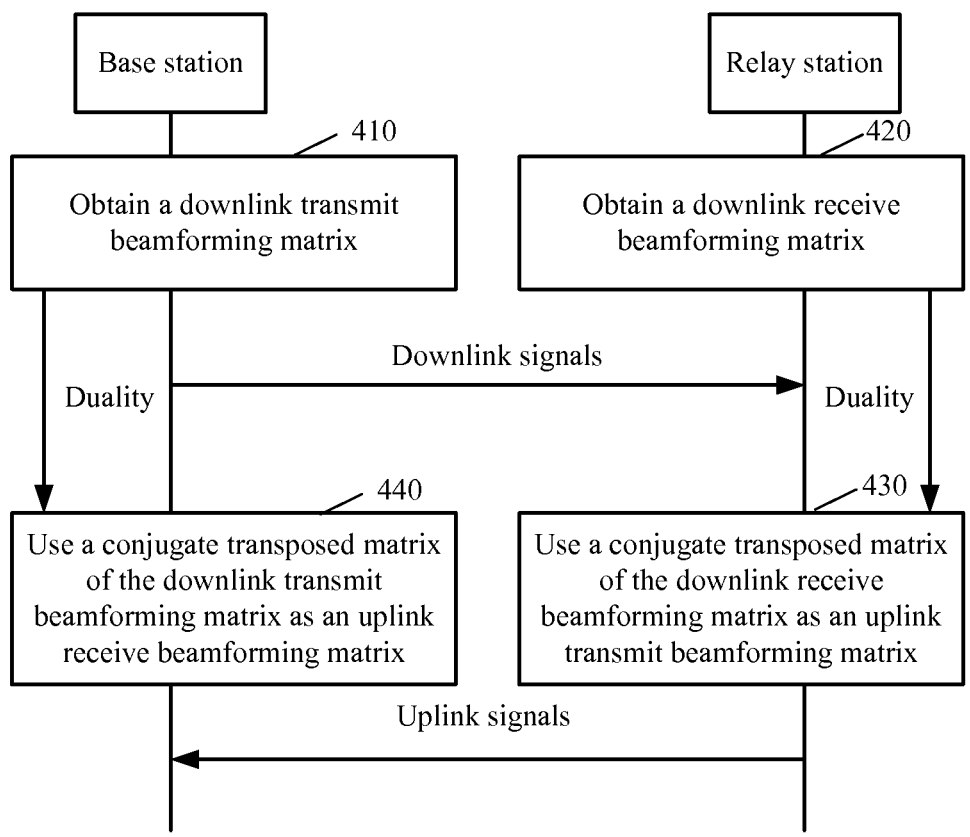
FIG. 4 is a schematic flowchart of a process of transmitting signal according to an embodiment of the present invention.

FIG. 4 is a schematic flowchart of a process of transmitting signal according to an embodiment of the present invention.

410. A base station obtains a downlink transmit beamforming matrix, and processes downlink signal sent to a relay station through the downlink transmit beamforming matrix.

According to the embodiment of the present invention, the base station may design the downlink transmit beamforming matrix in a conventional way, for example, the base station uses the SVD to design the downlink transmit beamforming matrix, so that the beam direction of the downlink signal sent by the base station points to the relay station, and that the performance of the relay backhaul link is improved to some extent.

420. The relay station obtains a downlink receive beamforming matrix, and processes downlink signal received from the base station through the downlink receive matrix.

According to the embodiment of the present invention, the relay station designs the downlink receive beamforming matrix in a conventional way, for example, the relay station uses the SVD to design the downlink receive beamforming matrix, so that the beam direction of the downlink signal received by the relay station points to the base station sending the signal, and that the performance of the relay backhaul link is improved to some extent.

430. The relay station uses a conjugate transposed matrix of the downlink receive beamforming matrix as an uplink transmit beamforming matrix for processing uplink signal sent to the base station.

For example, the relay station uses the conjugate transposed matrix of the downlink receive beamforming matrix as an uplink transmit beamforming matrix, which may simplify design of the uplink transmit beamforming matrix.

440. The base station uses a conjugate transposed matrix of the downlink transmit beamforming matrix as an uplink receive beamforming matrix for processing uplink signal received from the relay station.

For example, the base station uses the conjugate transposed matrix of the downlink transmit beamforming matrix as an uplink receive beamforming matrix, which may simplify design of the uplink receive beamforming matrix.

It should be understood that the sequence of step 410 and step 420 may be reversed and that the sequence of step 430 and step 440 may also be reversed.

Figure 5:
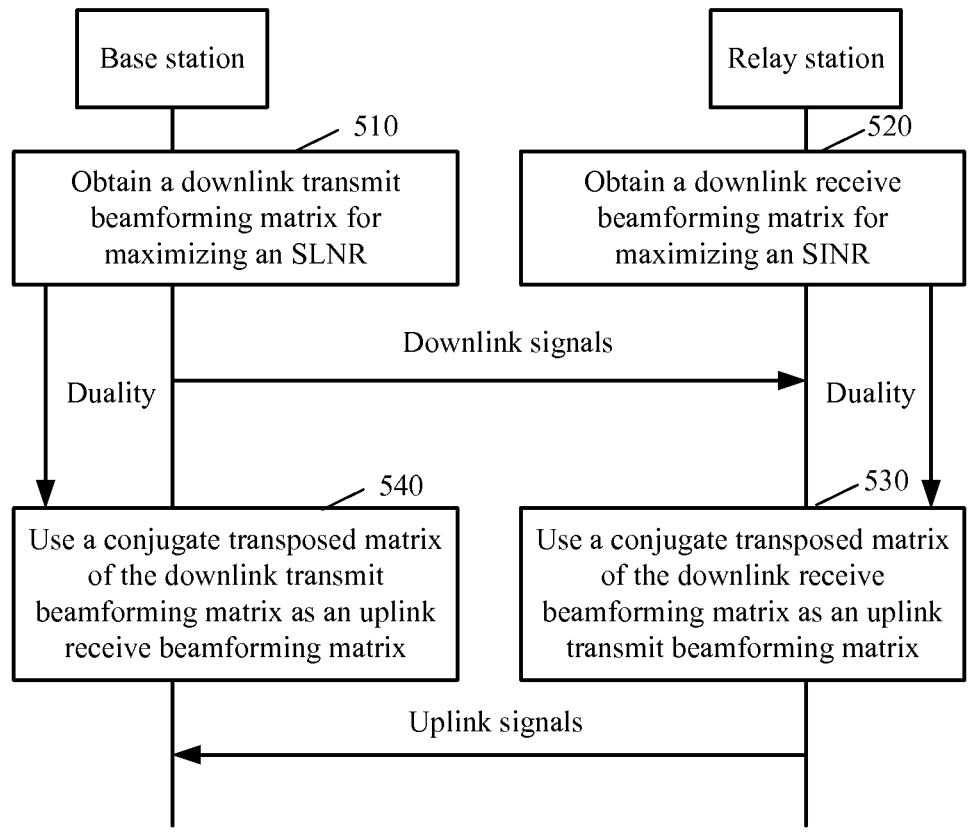
FIG. 5 is a schematic flowchart of a process of transmitting signal according to another embodiment of the present invention.

FIG. 5 is a schematic flowchart of a process of transmitting signal according to another embodiment of the present invention.

According to the embodiment of the present invention, in the case of duality of a transceiver filter of the base station and duality of a transceiver filter of the relay station, an uplink beamforming algorithm may be designed, thereby suppressing the interference between relay stations in a cell and inter-cell interference.

510. A base station obtains a downlink transmit beamforming matrix for maximizing an SLNR.

For example, in the TDD system, the base station may first measure the uplink channel state information (Channel State Information at the Receiver, CSIR) from each relay station to the base station through demodulation reference signal (Demodulation Reference Signal, DMRS), and then may use channel reciprocity of the TDD system to obtain the downlink channel state information (Channel State Information at the Transmitter, CSIT) from the base station to each relay station. The CSIR and the CSIT respectively indicate channel state information at the receiver and state information at the transmitter. For example, for the uplink, the channel information used by the base station for calculating the uplink receive beamforming matrix may be indicated by CSIR; for the downlink, the channel information used by the base station for calculating the downlink transmit beamforming matrix may be indicated by CSIT. The channel matrix H may be obtained through various pilot signal.

After beamforming, the received signal at relay i are:

$$\vec{Y}_i = \vec{R}_i \overline{H}_i \overline{W}_i \vec{X}_i + \vec{R}_i \sum_{j \neq i} \overline{H}_i \overline{W}_j \vec{X}_j + \vec{R}_i \vec{\Psi}_i + \vec{R}_i \vec{Z}_i \qquad (1)$$

where: $\vec{X}_i$ is the signal sent by the base station to relay station i, and $X_i \in C^{d \times 1}$; d is the number of streams; $\vec{W}_i$ is a downlink transmit beamforming matrix to be solved, and $\vec{W}_i \in C^{M \times d}$; $\overline{H}_i$ is the channel matrix from the base station to relay station i, and $\overline{H}_i \in C^{N \times M}$; $\overline{H}_j$ is the channel matrix from the base station to relay station j, and $\overline{H}_j \in C^{N \times M}$; $\vec{\Psi}_i$ indicates the total interference signal $\vec{\Psi}_i \in C^{N \times 1}$ outside the cell, $\vec{Z}_i$ is the noise at relay i, and $\vec{Z}_i \in C^{N \times 1}$; $E(Z_i Z_i^H) = \sigma_i^2 I$, where $\sigma_i^2 I$ is the covariance matrix of an additive white Gaussian noise vector; and $\vec{R}_i$ is the downlink receive beamforming matrix of relay station i, and $\vec{R}_i \in C^{d \times N}$, where M is the number of antennas, and N is the number of antennas of relay i.

Through calculation, the SLNR of relay station i is:

$$SLNR = \frac{Tr(\overline{W}_i^H \overline{H}_i^H \overline{H}_i \overline{W}_i)}{N\sigma_i^2 + Tr\left[\overline{W}_i^H \sum_{j \neq i} \overline{H}_j^H \overline{H}_j \overline{W}_i\right]} = \frac{Tr(\overline{W}_i^H \overline{H}_i^H \overline{H}_i \overline{W}_i)}{Tr\left[\overline{W}_i^H \left(N\sigma_i^2 I + \sum_{j \neq i} \overline{H}_j^H \overline{H}_j\right) \overline{W}_i\right]}$$

The downlink transmit beamforming matrix may be solved for maximizing the SLNR at relay station i:

$$\vec{W}_i^o = \underset{\vec{W}_i \in C^{M \times d}}{\arg \max} SLNR = \underset{\vec{W}_i \in C^{M \times d}}{\arg \max} \frac{Tr(\vec{W}_i^H \vec{H}_i^H \vec{H}_i \vec{W}_i)}{Tr\left[\vec{W}_i^H \left(N\sigma_i^2 I + \sum_{j \neq i} \vec{H}_j^H \vec{H}_j\right) \vec{W}_i\right]} \quad (2)$$

where, $\vec{W}_i^o$ may be solved according to the Rayleigh entropy theorem, that is, $\vec{W}_i^o$ is an eigenvector corresponding to the maximum generalized eigenvalue of a matrix pair $$\left\{\vec{H}_i^H \vec{H}_i, \left(N\sigma_i^2 I + \sum_{j \neq i} \vec{H}_j^H \vec{H}_j\right)\right\}.$$

The following proves that W is the eigenvectors corresponding to the first d maximum generalized eigenvalues of the matrix pair $$\left\{\vec{H}_i^H \vec{H}_i, \left(N\sigma_i^2 I + \sum_{j \neq i} \vec{H}_j^H \vec{H}_j\right)\right\}$$

in multi-stream transmission ($\vec{W}_i \in C^{M \times d}$, d>1).

According to the Rayleigh entropy theorem, in the case of single-stream transmission (d=1), $\vec{W}_i^o$ is the eigenvector corresponding to the maximum generalized eigenvalue of the matrix pair $$\left\{\vec{H}_i^H \vec{H}_i, \left(N\sigma_i^2 I + \sum_{j \neq i} \vec{H}_j^H \vec{H}_j\right)\right\}.$$

$Tr(\vec{W}_i^H \vec{W}_i)=1$, that is, in the proof, the sum of power for constraining transmit vectors is 1.

In the case of multi-stream transmission (d>1), $\vec{W}_i^o$ is the eigenvectors corresponding to the first d maximum generalized eigenvalues of the matrix pair $$\left\{\vec{H}_i^H \vec{H}_i, \left(N\sigma_i^2 I + \sum_{j \neq i} \vec{H}_j^H \vec{H}_j\right)\right\}.$$

The proof is as follows:

In formula (2), $\vec{H}_i^H \vec{H}_i$ is a Hermite matrix, and $$\left(N\sigma_i^2 I + \sum_{j \neq i} \vec{H}_j^H \vec{H}_j\right)$$

is a positive definite Hermite matrix. Therefore, $$\left\{\vec{H}_i^H \vec{H}_i, \left(N\sigma_i^2 I + \sum_{j \neq i} \vec{H}_j^H \vec{H}_j\right)\right\}$$

is a regular matrix pencil. There is an invertible matrix $T_i \in C^{M \times M}$ that satisfies $T_i^H \vec{H}_i^H \vec{H}_i T_i = \Lambda_i$ and $$T_i^H \left(N\sigma_i^2 I + \sum_{j \neq i} \vec{H}_j^H \vec{H}_j\right) T_i = I.$$

$\Lambda_i = \text{diag}(\lambda_1, \lambda_2, \ldots, \lambda_d, \ldots \lambda_N)$, and $\lambda_1 \geq \ldots \geq \lambda_d \geq \ldots \geq \lambda_N \geq 0$. $\lambda_1, \lambda_2, \ldots, \lambda_d, \ldots \lambda_N$ is the generalized eigenvalue of the regular matrix pencil $$\left\{\vec{H}_i^H \vec{H}_i, \left(N\sigma_i^2 + \sum_{j \neq i} \vec{H}_j^H \vec{H}_j\right)\right\}.$$

Assuming $\vec{W}_i = T_i \vec{G}_i$, where $\vec{G}_i \in C^{M \times d}$, because $T_i$ is invertible, $\vec{W}_i$ corresponds to $\vec{G}_i$ on a one-to-one basis. The following may be obtained:

$$\frac{Tr(\vec{W}_i^H \vec{H}_i^H \vec{H}_i \vec{W}_i)}{Tr\left[\vec{W}_i^H \left(N\sigma_i^2 + \sum_{j \neq i} \vec{H}_j^H \vec{H}_j\right) \vec{W}_i\right]} = \frac{Tr(\vec{G}_i^H \Lambda_i \vec{G}_i)}{Tr(\vec{G}_i^H \vec{G}_i)} \quad (3)$$

SVD is performed for $\vec{G}_i$, and $$\vec{G}_i = U_i \begin{bmatrix} \Sigma_i \\ 0 \end{bmatrix} V_i^H,$$

where $U_i$ and $V_i$ are unitary matrixes, $U_i \in C^{M \times M}$, $V_i \in C^{d \times d}$, and $\Sigma_i = \text{diag}(\kappa_1, \kappa_2, \ldots, \kappa_m)$. Therefore, the above formula may be written as follows:

$$\frac{Tr(\vec{G}_i^H \Lambda_i \vec{G}_i)}{Tr(\vec{G}_i^H \vec{G}_i)} = \frac{Tr\left(\begin{bmatrix} \Sigma_i^H & 0 \end{bmatrix} U_i^H \Lambda_i U_i \begin{bmatrix} \Sigma_i \\ 0 \end{bmatrix}\right)}{Tr\left(\begin{bmatrix} \Sigma_i^H & 0 \end{bmatrix} \begin{bmatrix} \Sigma_i \\ 0 \end{bmatrix}\right)} = \frac{\sum_{i=1}^{m} |\kappa_i|^2 \left(\sum_{j=1}^{N} \lambda_j |u_{ij}|^2\right)}{\sum_{i=1}^{m} |\kappa_i|^2} \quad (4)$$

When $u_{ii}=1$, $u_{ij}=0$, $j \neq i$, $j=1, \ldots, m$, a maximum value is obtained by the above formula, and in this case, $$\vec{G}_i = \begin{bmatrix} I_{m \times m} \\ 0 \end{bmatrix}.$$

Performing proper amplification and minification for $\vec{W}_i = T_i \vec{G}_i$ may enable $\vec{W}_i$ to satisfy $Tr(\vec{W}_i^H \vec{W}_i)=1$. The proof is complete.

520. The relay station obtains a downlink receive beamforming matrix for maximizing an SINR.

For example, in the TDD system, the relay station first uses cell-specific reference signal (Cell-specific Reference Signal, CRS) sent by the base station to obtain an interference plus noise covariance matrix at a pilot. The specific method is: at the pilot, multiplying channel estimation by known pilot information, subtracting the obtained value from the received signal, and then solving autocorrelation of the difference to obtain an interference covariance matrix at the pilot; at a non-pilot, obtaining an interference plus noise covariance matrix through linear interpolation. Meanwhile, the relay station may use user-specific reference signal, for example, demodulation reference signal (Demodulation Reference Signal, DM-RS), to measure an equivalent channel.

After beamforming, the formula of the received signal at relay i may be shown in formula (1).

Through calculation, the SINR of relay i is:

$$SINR_i = \frac{\vec{R}_i \vec{H}_i \vec{W}_i \vec{W}_i^H \vec{H}_i^H \vec{R}_i^H}{\vec{R}_i(\vec{Q}_i + \sigma_i^2 I)\vec{R}_i^H} \qquad (5)$$

For example, for the downlink, the downlink receive beamforming matrix may be designed by using the maximized SINR:

$$\max_{\vec{R}_i} SINR = \max_{\vec{R}_i} \frac{\vec{R}_i \vec{H}_i \vec{W}_i \vec{W}_i^H \vec{H}_i^H \vec{R}_i^H}{\vec{R}_i(\vec{Q}_i + \sigma_i^2 I)\vec{R}_i^H} \qquad (6)$$

To maximize the SINR, it may be obtained by using a Lagrange multiplier that the downlink receive beamforming matrix is $\vec{R}_i = (\vec{Q}_i + \sigma_i^2 I)^{-1} \vec{H}_i \vec{W}$. $\vec{H}_i \vec{W}$ is the above equivalent channel and may be obtained through user reference signals (DM-RS). $(\vec{Q}_i + \sigma_i^2 I)$ is the interference plus noise covariance matrix and may be obtained through cell-specific reference signal through calculation. Therefore, when the SINR is used to solve the receive matrix, there is only one variable $\vec{R}_i$, that is, the SINR of relay i depends on only the beamforming vector of relay i, and is irrelevant to beamforming vectors of other relays. Therefore, the Lagrange multiplier may be used to solve the optimal beamforming vector, without considering the iterative joint optimization problem of multiple relays, and the solving process is simple. Using the downlink receive beamforming matrix as the uplink transmit beamforming matrix may reach the purpose of suppressing inter-cell interference. Herein maximizing the SINR refers to maximizing the ratio of wanted signal energy sent by the base station of the current cell to relay station i to interference signal energy received by relay station i from the base stations of other cells plus the noise energy.

530. The relay station uses a conjugate transposed matrix of the downlink receive beamforming matrix as an uplink transmit beamforming matrix for processing uplink signal.

According to the embodiment of the present invention, at the relay station, by using duality, the conjugate transposed matrix of the downlink receive beamforming matrix designed for maximizing the SINR is used as the uplink transmit beamforming matrix, so that the criterion of maximizing the SINR based on which the downlink receive beamforming matrix is designed is equivalent to the criterion of maximizing the SLNR based on which the uplink transmit beamforming matrix is designed. The specific proof is as follows:

For example, at the relay station or a user equipment, designing the receive matrix for maximizing the SINR solves the following problem:

$$\vec{R}_i = \underset{\vec{R}_i}{\mathrm{argmax}}\, SINR \qquad (7)$$

$$= \underset{\vec{R}_i}{\mathrm{argmax}} \frac{Tr(\vec{R}_i \vec{H}_i \vec{W}_i \vec{W}_i^H \vec{H}_i^H \vec{R}_i^H)}{Tr(\vec{R}_i(\sigma_i^2 I + Q_i)\vec{R}_i^H)}$$

$$= \underset{\vec{R}_i}{\mathrm{argmax}} \frac{Tr(\vec{R}_i \vec{H}_i \vec{W}_i \vec{W}_i^H \vec{H}_i^H \vec{R}_i^H)}{Tr\left(\vec{R}_i\left(\sigma_i^2 I + \sum_{j\_int}(\vec{H}_{j\_int}\vec{W}_{j\_int}\vec{W}_{j\_int}^H \vec{H}_{j\_int}^H)\right)\vec{R}_i^H\right)}$$

$$= \underset{\vec{R}_i}{\mathrm{argmax}} \frac{Tr(\vec{R}_i \vec{H}_i \vec{W}_i \vec{W}_i^H \vec{H}_i^H \vec{R}_i^H)}{\sigma_i^2 + Tr\left(\vec{R}_i \sum_{j\_int}(\vec{H}_{j\_int}\vec{W}_{j\_int}\vec{W}_{j\_int}^H \vec{H}_{j\_int}^H)\vec{R}_i^H\right)}$$

$$\text{s.t. } tr(\vec{R}_i^H \vec{R}_i) = 1, i = 1, \ldots, K \quad \vec{R}_i: d \times N$$

$$\vec{R}_i \sum_{j\_int} (\vec{H}_{j\_int} \vec{W}_{j\_int} \vec{W}_{j\_int}^H \vec{H}_{j\_int}^H) \vec{R}_i^H$$

is interference on relay i from the signal sent by the base stations of other cells when the signal pass through the inter-cell channel $\vec{H}_{j\_int}$. $\vec{R}_i$ is the downlink receive beamforming matrix, and should be expressed as $\vec{R}_i : d \times N$, where d is the number of streams, namely, supporting multi-stream transmission, for example, d=2, supporting dual-stream transmission. $\vec{H}_i$ is the channel matrix from the base station to relay i. $\vec{W}_i$ is a i downlink transmit beamforming matrix. $\sigma_i^2$ is the noise power after receive beamforming processing at relay station i.

At the relay station or the user equipment, designing the uplink transmit beamforming matrix for maximizing the SLNR (that is, energy leaked into other cells is minimized) solves the following problem:

$$\overleftarrow{R}_i = \underset{\overleftarrow{R}_i}{\mathrm{argmax}}\, SLNR \qquad (8)$$

$$= \underset{\overleftarrow{R}_i}{\mathrm{argmax}} \frac{Tr(\overleftarrow{R}_i^H \vec{H}_i^H \vec{W}_i^H \vec{W}_i \vec{H}_i \overleftarrow{R}_i)}{Tr\left(\overleftarrow{R}_i^H \left(\sigma_i^2 I + \sum_{j\_int}(\vec{H}_{j\_int}^H \vec{W}_{j\_int}^H \vec{W}_{j\_int} \vec{H}_{j\_int})\right)\overleftarrow{R}_i\right)}$$

$$= \underset{\overleftarrow{R}_i}{\mathrm{argmax}} \frac{Tr(\overleftarrow{R}_i^H \vec{H}_i^H \vec{W}_i^H \vec{W}_i \vec{H}_i \overleftarrow{R}_i)}{\sigma_i^2 + Tr\left(\overleftarrow{R}_i^H \sum_{j\_int}(\vec{H}_{j\_int}^H \vec{W}_{j\_int}^H \vec{W}_{j\_int} \vec{H}_{j\_int})\overleftarrow{R}_i\right)}$$

$$\text{s.t. } tr(\overleftarrow{R}_i^H \overleftarrow{R}_i) = 1, i = 1, \ldots, K \quad \overleftarrow{R}_i: d \times N$$

where,

-continued $$\frac{Tr(\vec{R}_i \vec{H}_i \vec{W}_i \vec{W}_i^H \vec{H}_i^H \vec{R}_i^H)}{\sigma_i^2 + Tr\left(\vec{R}_i \sum_{j\_int} (\vec{H}_{j\_int} \vec{W}_{j\_int} \vec{W}_{j\_int}^H \vec{H}_{j\_int}^H) \vec{R}_i^H\right)} \Leftrightarrow \tag{9}$$

$$\frac{Tr(\overleftarrow{R}_i^H \overleftarrow{H}_i^H \overleftarrow{W}_i^H \overleftarrow{W}_i \overleftarrow{H}_i \overleftarrow{R}_i)}{\sigma_i^2 + Tr\left(\overleftarrow{R}_i^H \sum_{j\_int} (\overleftarrow{H}_{j\_int}^H \overleftarrow{W}_{j\_int}^H \overleftarrow{W}_{j\_int} \overleftarrow{H}_{j\_int}) \overleftarrow{R}_i\right)}$$

$\overleftarrow{W}_i$ is the uplink receive beamforming matrix at the base station. $\overleftarrow{H}_i$ is the channel matrix from relay i to the base station. $\overleftarrow{R}_i$ is the uplink transmit beamforming matrix of relay i. $\sigma_i^2$ is the noise power after receive beamforming processing at the base station.

Actually, usually it is regarded that noise power spectrums of the base station and relay station are consistent, and in the case of strong interference, the impact of a noise may be ignored.

As seen from formula (9), in the TDD system, it can be known from reciprocity that $\overleftarrow{H}_i = \vec{H}_i^H$; in the case of duality of the transceiver filter of the base station and duality of the transceiver filter of the relay (for example, $\vec{R}_i = \overleftarrow{R}_i^H$ and $\vec{W}_i = \overleftarrow{W}_i^H$), the criterion of maximizing the SINR based on which the downlink receive beamforming matrix is designed is equivalent to the criterion of maximizing the SLNR based on which the uplink transmit beamforming matrix is designed.

According to the embodiment of the present invention, the conjugate transposed matrix of the downlink receive beamforming matrix is used as the uplink transmit beamforming matrix, that is, the criterion of maximizing the SINR based on which the downlink receive beamforming matrix is designed is equivalent to the criterion of maximizing the SLNR based on which the uplink transmit beamforming matrix is designed, which may be understood as maximizing the ratio of wanted signal energy sent by relay station i in the uplink backhaul link to the base station of the current cell to the sum of signal energy leaked from relay station i to the base stations of other cells and noise energy. When the relay station uses the above uplink transmit beamforming matrix to process the uplink signal sent to the base station, inter-cell interference may be suppressed.

540. The base station uses a conjugate transposed matrix of the downlink transmit beamforming matrix as an uplink receive beamforming matrix for processing uplink signal.

According to the embodiment of the present invention, at the base station, by using duality, the conjugate transposed matrix of the downlink transmit beamforming matrix designed for maximizing the SLNR is used as the uplink receive beamforming matrix, so that the criterion of maximizing the SLNR based on which the downlink transmit beamforming matrix is designed is equivalent to the criterion of maximizing the SINR based on which the uplink receive beamforming matrix is designed. The specific proof is as follows:

For example, at the base station, designing the downlink transmit matrix for maximizing the SLNR solves the following optimization problem:

$$\vec{W}_i = \underset{\vec{W}_i}{\mathrm{argmax}}\ SLNR \tag{10}$$

$$= \underset{\vec{W}_i}{\mathrm{argmax}} \frac{Tr(\vec{W}_i^H \vec{H}_i^H \vec{R}_i^H \vec{R}_i \vec{H}_i \vec{W}_i)}{Tr\left(\vec{W}_i^H \left(\sigma_i^2 I + \sum_{j \neq i}(\vec{H}_j^H \vec{R}_j^H \vec{R}_j \vec{H}_j)\right) \vec{W}_i\right)}$$

$$= \underset{\vec{W}_i}{\mathrm{argmax}} \frac{Tr(\vec{W}_i^H \vec{H}_i^H \vec{R}_i^H \vec{R}_i \vec{H}_i \vec{W}_i)}{\sigma_i^2 + Tr\left(\vec{W}_i^H \sum_{j \neq i}(\vec{H}_j^H \vec{R}_j^H \vec{R}_j \vec{H}_j) \vec{W}_i\right)}$$

s.t. $tr(\vec{W}_i^H \vec{W}_i) = 1, i = 1, \ldots, K \quad \vec{W}_i: M \times N$ where: $\vec{W}_i^H \sum_{j \neq i}(\vec{H}_j^H \vec{R}_j^H \vec{R}_j \vec{H}_j) \vec{W}_i$ is energy leaked to other relay stations in the current cell, from the information sent by the base station to relay station i. $\sigma_i^2$ is the noise power after the receive beamforming matrix processing of the relay at relay station i. $\vec{W}_i$ is the downlink transmit beamforming matrix, and corresponding to the above, $\vec{W}_i$ should be expressed as $\vec{W}: M \times d$. d is the number of streams, namely, supporting multi-stream transmission. $\vec{H}_i$ is the channel matrix from the base station to relay station i.

At the base station, designing the downlink receive beamforming matrix for maximizing the SINR solves the following problem:

In the case of considering only the impact of intra-cell interference, the received signal at the base station may be expressed as:

$$y_{BS} = \overleftarrow{W}_i \overleftarrow{H}_i \overleftarrow{R}_i \overleftarrow{X}_i + \overleftarrow{W}_i \sum_{j \neq i} \overleftarrow{H}_j \overleftarrow{R}_j \overleftarrow{X}_j + \overleftarrow{Z} \tag{11}$$

where: $\overleftarrow{H}_j \overleftarrow{R}_j \overleftarrow{X}_j$ is the signal sent by relay j in the cell to the base station and is an interference signal. $\overleftarrow{W}_i$ is the uplink receive beamforming matrix at the base station. $\overleftarrow{H}_i$ is the channel matrix from relay station i to the base station. $\overleftarrow{R}_i$ is an uplink transmit beamforming matrix. $\overleftarrow{Z}$ is the noise at the base station.

$$\overleftarrow{W}_i = \underset{\overleftarrow{W}_i}{\mathrm{argmax}}\ SINR = \tag{12}$$

$$\underset{\overleftarrow{W}_i}{\mathrm{argmax}} \frac{Tr(\overleftarrow{W}_i \overleftarrow{H}_i \overleftarrow{R}_i \overleftarrow{R}_i^H \overleftarrow{H}_i^H \overleftarrow{W}_i^H)}{Tr\left(\sum_{j \neq i} \overleftarrow{W}_i \overleftarrow{H}_j \overleftarrow{R}_j \overleftarrow{R}_j^H \overleftarrow{H}_j^H \overleftarrow{W}_i^H + \overleftarrow{W}_i \sigma_i^2 I \overleftarrow{W}_i^H\right)}$$

s.t. $tr(\overleftarrow{W}_i^H \overleftarrow{W}_i) = 1, i = 1, \ldots, K\ \overleftarrow{W}_i: d \times M$ where, $$\frac{Tr(\vec{W}_i^H \vec{H}_i^H \vec{R}_i^H \vec{R}_i \vec{H}_i \vec{W}_i)}{\sigma_i^2 + Tr\left(\sum_{j\neq i}(\vec{W}_i^H \vec{H}_j^H \vec{R}_j^H \vec{R}_j \vec{H}_j \vec{W}_i)\right)} \Leftrightarrow \quad (13)$$

$$\frac{Tr(\overline{W}_i \overline{H}_i \overline{R}_i \overline{R}_i^H \overline{H}_i^H \overline{W}_i^H)}{\sigma_i^2 + Tr\left(\sum_{j\neq i} \overline{W}_i \overline{H}_j \overline{R}_j \overline{R}_j^H \overline{H}_j^H \overline{W}_i^H\right)}$$

In actual applications, usually it is regarded that noise power spectrums of the base station and relay station are consistent, and in the case of strong interference, the impact of a noise may be ignored.

In formula (12), $$\sum_{j\neq i} \overline{W}_i \overline{H}_j \overline{R}_j \overline{R}_j^H \overline{H}_j^H \overline{W}_i^H$$

is the interference on the signal sent by relay i to the base station from the signal sent by a relay in a neighboring cell. As seen from formula (13), in the TDD system, it can be known from reciprocity that $\vec{H}_i = \overline{H}_i^H$; in the case of duality of the transceiver filter of the base station and duality of the transceiver filter of the relay (for example, for relay i, $\vec{R}_i = \overline{R}_i^H$ and $\vec{W}_i = \overline{W}_i^H$), the criterion of maximizing the SLNR based on which the downlink transmit beamforming matrix is designed is equivalent to the criterion of maximizing the SINR based on which the uplink receive beamforming matrix is designed.

According to the embodiment of the present invention, the conjugate transposed matrix of the downlink transmit beamforming matrix is used as the uplink receive beamforming matrix, that is, the criterion of maximizing the SLNR based on which the downlink transmit beamforming matrix is designed is equivalent to the criterion of maximizing the SINR based on which the uplink receive beamforming matrix is designed, which may be understood as minimizing the interference caused by the signal sent by other relays on the backhaul uplink to the base station, on the signal sent by the target relay to the base station. When the base station uses the above uplink receive beamforming matrix to process the uplink signal received from relay station i, intra-cell interference may be suppressed.

It should be understood that the sequence of step 510 and step 520 may be reversed and that the sequence of step 530 and step 540 may also be reversed.

According to the embodiment of the present invention, the base station may design the downlink transmit beamforming matrix for maximizing the SLNR, and according to the duality principle of the uplink and downlink, use the conjugate transposed matrix of the downlink transmit matrix as an uplink receive beamforming matrix to suppress intra-cell interference. The relay station may design the downlink receive beamforming matrix for maximizing the SINR, and according to the duality principle of the uplink and downlink, use the conjugate transposed matrix of the downlink receive beamforming matrix as an uplink transmit matrix to suppress inter-cell interference.

It should be noted that in actual applications, the process of obtaining the uplink transmit beamforming matrix in the embodiment and the process of obtaining the uplink receive beamforming matrix may be used separately or together. For example, the uplink transmit beamforming matrix is obtained by using the above method to cancel inter-cell interference, while the uplink receive beamforming matrix is obtained by using the above method to cancel the interference between relay stations in the cell.

Optionally, in another embodiment, when the uplink beamforming matrix is designed under the prerequisite of duality of the transceiver to suppress inter-cell interference, the following step may be executed: The base station designs, in a conventional way (for example, SVD), the downlink transmit beamforming matrix to realize a purpose (for example, improving the performance of the relay backhaul link to some extent); the relay station designs the downlink receive beamforming matrix for maximizing the SINR, and uses the conjugate transposed matrix of the downlink receive beamforming matrix as the uplink transmit beamforming matrix to suppress inter-cell interference (similar to step 520 of FIG. 5 and not further described herein); according to duality of the uplink and downlink, the conjugate transposed matrix of the downlink transmit beamforming matrix of the base station is used as the uplink receive beamforming matrix, so that in the case of duality of the transceiver filter of the base station and duality of the transceiver filter of the relay, the criterion of maximizing the SINR based on which the downlink receive beamforming matrix is designed is equivalent to the criterion of maximizing the SLNR based on which the uplink transmit beamforming matrix is designed, thereby suppressing inter-cell interference. In addition, according to the embodiment of the present invention, the conjugate transposed matrix of the downlink beamforming matrix may be used as the uplink beamforming matrix, thereby simplifying the process of designing the uplink beamforming matrix.

Optionally, in another embodiment, when the uplink beamforming algorithm is designed under the prerequisite of duality of the transceiver to suppress intra-cell interference, the following step may be executed: The base station designs the downlink transmit beamforming matrix for maximizing the SLNR (similar to step 510 of FIG. 5 and not further described herein); the relay station designs the downlink receive beamforming matrix in a conventional way (for example, SVD) and uses the conjugate transposed matrix of the downlink receive beamforming matrix as the uplink transmit beamforming matrix to realize a purpose (for example, improving the performance of the relay backhaul link to some extent); in the case of duality of the transceiver filter of the base station (conjugate transposed) and duality of the transceiver filter of the relay, that is, using the conjugate transposed matrix of the downlink transmit matrix of the base station as the uplink receive beamforming matrix, according to duality of the uplink and downlink, the criterion of maximizing the SLNR based on which the downlink transmit beamforming matrix is designed is equivalent to the criterion of maximizing the SNR based on which the uplink receive beamforming matrix is designed, thereby canceling interference between relay stations in the cell. In addition, according to the embodiment of the present invention, the conjugate transposed matrix of the downlink beamforming matrix may be used as the uplink beamforming matrix, thereby simplifying the process of designing the uplink beamforming matrix.

The above describes the method for transmitting signal according to the embodiment of the present invention. The following describes a device for transmitting signal according to an embodiment of the present invention with reference to FIG. 6 and FIG. 7.

Figure 6:
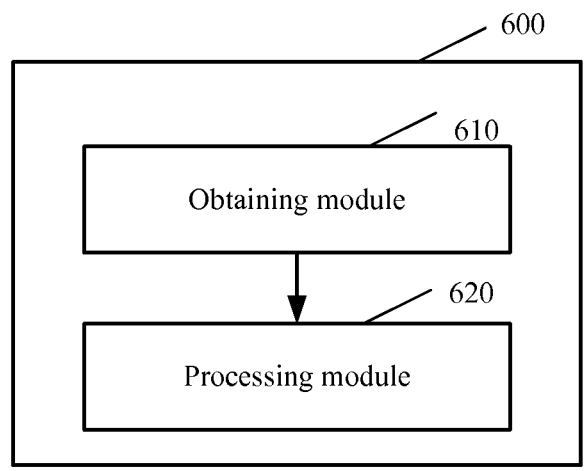
FIG. 6 is a schematic structural diagram of a device for transmitting signal according to an embodiment of the present invention.

FIG. 6 is a schematic structural diagram of a device 600 for transmitting signal according to an embodiment of the present invention. The device 600 includes an obtaining module 610 and a processing module 620.

The obtaining module 610 obtains a downlink transmit beamforming matrix. The processing module 620 uses a conjugate transposed matrix of the downlink transmit beamforming matrix as an uplink receive beamforming matrix for processing uplink signal.

In the embodiment of the present invention, the conjugate transposed matrix of the downlink transmit beamforming matrix may be used as the uplink receive beamforming matrix for processing uplink signal, which can simplify design of the uplink receive beamforming matrix and thereby reduce complexity of the system.

The device 600 is a first communication device, and the obtaining module 610 obtains the downlink transmit beamforming matrix based on a signal to leakage plus noise ratio at a second communication device, and the processing module 620 uses the conjugate transposed matrix of the downlink transmit beamforming matrix as the uplink receive beamforming matrix for processing uplink signal received from the second communication device.

The obtaining module 610 obtains, according to a covariance matrix of an additive white Gaussian noise vector at the second communication device and a channel matrix from the first communication device to the second communication device, a downlink transmit beamforming matrix that maximizes the signal to leakage plus noise ratio at the second communication device.

The obtaining module 610 is configured to obtain the downlink transmit beamforming matrix through the following formula:

$$\underset{\vec{W}_i \in C^{M \times d}}{\mathrm{argmax}}\ SLNR = \underset{\vec{W}_i \in C^{M \times d}}{\mathrm{argmax}}\ \frac{Tr\left(\vec{W}_i^H \vec{H}_i^H \vec{H}_i \vec{W}_i\right)}{Tr\left[\vec{W}_i^H \left(N\sigma_i^2 I + \sum_{j \neq i} \vec{H}_j^H \vec{H}_j\right) \vec{W}_i\right]};$$

where: i is a serial number of the second communication device, and the SLNR is the signal to leakage plus noise ratio at the second communication device; $\vec{W}_i$ is a downlink transmit beamforming matrix to be solved, and $\vec{W}_i \in C^{M \times d}$; $\vec{H}_i$ is a channel matrix from the first communication device to a second communication device i, and $\vec{H}_i \in C^{N \times M}$; $\vec{H}_j$ is a channel matrix from the first communication device to a second communication device j, and $\vec{H}_j \in C^{N \times M}$; $\sigma_i^2$ is a power spectral density of an additive white Gaussian noise of each antenna at the second communication device i, and $\sigma_i^2 I \in C^{M \times M}$; d is the number of data streams sent by the first communication device; M is the number of antennas of the first communication device; and N is the number of antennas of the second communication device i, where i and j are integers.

According to the embodiment of the present invention, when d=1, the downlink transmit beamforming matrix is an eigenvector corresponding to the maximum generalized eigenvalue of a matrix pair $$\left\{\vec{H}_i^H \vec{H}_i, \left(N\sigma_i^2 I + \sum_{j \neq i} \vec{H}_j^H \vec{H}_j\right)\right\};$$

or when d>1, the downlink transmit beamforming matrix is eigenvectors corresponding to first d maximum generalized eigenvalues of the matrix pair $$d\left\{\vec{H}_i^H \vec{H}_i, \left(N\sigma_i^2 I + \sum_{j \neq i} \vec{H}_j^H \vec{H}_j\right)\right\}.$$

The processing module 620 uses, in the case of duality of a transceiver filter of the first communication device and duality of a transceiver filter of the second communication device, the conjugate transposed matrix of the downlink beamforming matrix as the uplink beamforming matrix for processing uplink signal.

The first communication device is a macro base station, and the second communication device is a relay station, a micro base station, or a user terminal.

According to the embodiment of the present invention, in the case of duality of the transceiver filter of the base station and duality of the transceiver filter of the relay station, the base station may use the above conjugate transposed matrix of the downlink transmit beamforming matrix as the uplink receive beamforming matrix for processing uplink signal received from the relay station, so that the criterion of maximizing the SLNR based on which the downlink transmit beamforming matrix is designed is equivalent to the criterion of maximizing the SINR based on which the uplink receive beamforming matrix is designed (not considering the uplink transmit beamforming but considering the uplink transmit beam is a unit matrix), thereby suppressing intracell interference.

For operations and functions of the obtaining module 610 and processing module 620 of the device, reference may be made to steps 110 and 120 of the method of FIG. 1, and the details are not further described herein for avoiding repetition.

Figure 7:
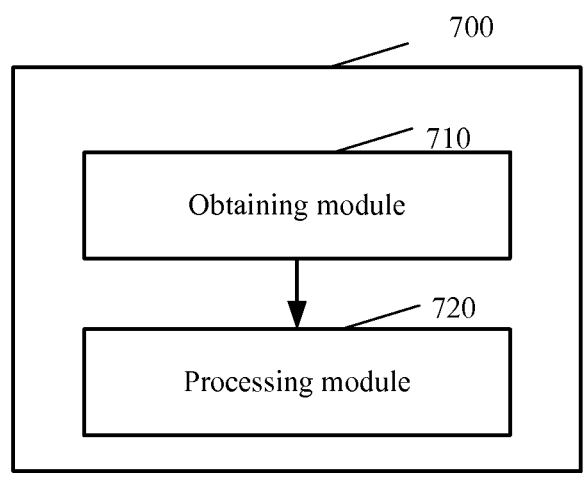
FIG. 7 is a schematic structural diagram of a device for transmitting signal according to another embodiment of the present invention.

FIG. 7 is a schematic structural diagram of a device 700 for transmitting signal according to another embodiment of the present invention. The device 700 includes an obtaining module 710 and a processing module 720.

The obtaining module 710 obtains a downlink receive beamforming matrix. The processing module 720 uses a conjugate transposed matrix of the downlink receive beamforming matrix as an uplink transmit beamforming matrix for processing uplink signal.

In the embodiment of the present invention, the conjugate transposed matrix of the downlink receive beamforming matrix may be used as the uplink transmit beamforming matrix for processing uplink signal, which can simplify design of the uplink transmit beamforming matrix and thereby reduce complexity of the system.

The device 700 is a second communication device, and the obtaining module 710 obtains the downlink receive beamforming matrix based on the signal to interference plus noise ratio at the second communication device, and the processing module 720 uses the conjugate transposed matrix of the downlink receive beamforming matrix as the uplink transmit beamforming matrix for processing uplink signal sent to the first communication device.

The obtaining module 710 obtains, according to an interference plus noise covariance matrix at the second communication device and an equivalent channel matrix from the first communication device to the second communication device, a downlink receive beamforming matrix that maximizes the signal to interference plus noise ratio at the second communication device.

The obtaining module 710 is configured to obtain the downlink receive beamforming matrix through the following formula:

$$\max_{\vec{R}_i} SINR = \max_{\vec{R}_i} \frac{\vec{R}_i \vec{H}_i \vec{W}_i \vec{W}_i^H \vec{H}_i^H \vec{R}_i^H}{\vec{R}_i (\vec{Q}_i + \sigma_i^2 I) \vec{R}_i^H}$$

where: i is a serial number of the second communication device, and the SINR is the signal to interference plus noise ratio at the second communication device; $(\vec{Q}_i + \sigma_i^2 I)$ is the interference plus noise covariance matrix at the second communication device and is obtained through cell-specific reference signal, where $\sigma_i^2 I \in C^{M \times M}$; $\vec{H}_i \vec{W}_i$ is the equivalent channel matrix from the first communication device to the second communication device and is obtained through user-specific reference signal, where $\vec{W}_i \in C^{M \times d}$ and $\vec{H}_i \in C^{N \times M}$; and $\vec{R}_i$ is a downlink receive beamforming matrix to be solved, and $\vec{R}_i \in C^{d \times N}$; M is the number of antennas of the first communication device; and N is the number of antennas of a second communication device i, where i and j are integers.

The processing module 720 uses, in the case of duality of a transceiver filter of the first communication device and duality of a transceiver filter of the second communication device, the conjugate transposed matrix of the downlink beamforming matrix as the uplink beamforming matrix for processing uplink signal.

The first communication device is a macro base station, and the second communication device is a relay station, a micro base station, or a user terminal.

According to the embodiment of the present invention, in the case of duality of the transceiver filter of the base station and duality of the transceiver filter of the relay station, the relay station may use the above conjugate transposed matrix of the downlink receive beamforming matrix as the uplink transmit beamforming matrix for processing uplink signal sent to the base station, so that the criterion of maximizing the SINR based on which the downlink receive beamforming matrix is designed is equivalent to the criterion of maximizing the SLNR based on which the uplink transmit beamforming matrix is designed, thereby suppressing inter-cell interference.

For operations and functions of the obtaining module 710 and processing module 720 of the device 700, reference may be made to steps 110 and 120 of the method of FIG. 1, and the details are not further described herein for avoiding repetition.

An embodiment of the present invention further provides a communication system, which may include the macro base station and the relay station in the above embodiment, or include a macro base station and a micro base station, or include a macro base station and a user equipment.

With respect to the problem that the relay station in the relay backhaul link suffers both the intra-cell interference and inter-cell interference, an embodiment of the present invention provides a solution for designing an uplink beamforming matrix. The solution does not require coordination between base stations, and only the base station designs the downlink transmit beamforming matrixes of different relay stations according to channel information in the cell, so that requirements for the system are reduced. At the base station, the design criterion based on the SLNR breaks the limit of the number of transmit antennas, thereby effectively suppressing interference between different relay stations in the cell. Meanwhile, the receive beamforming of the relay station aims to maximize the SINR, so that the beam direction may reach an optimal compromise between the main beam pointing to the wanted signal direction and the null beam pointing to the interference signal direction, and then the direction is used as the transmit direction of the uplink beam, thereby achieving a good compromise between the main beam of uplink signal pointing to the target base station direction and the null beam pointing to the leakage signal direction of the base station of a neighboring cell. In addition, the whole algorithm design is simple and does not use an iteration algorithm, saving overheads and enhancing performance of the relay backhaul link.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or part of the technical solutions may be implemented in the form of a software product. The computer software product is stored in a storage medium, and includes several instructions for instructing a computer device (which may be a personal computer, a server, or a network device and so on) to perform all or a part of the steps of the method described in the embodiment of the present invention. The storage medium includes: any medium that can store program codes, such as a USB flash disk, a removable hard disk, a read-only memory (Read-Only Memory, ROM), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for transmitting signal, comprising:
   obtaining a downlink beamforming matrix by optimizing a quantity with respect to the beamforming matrix for a channel matrix between a first communication device and a second communication device; and
   using a conjugate transposed matrix of the downlink beamforming matrix as an uplink beamforming matrix for processing an uplink signal,
   wherein the first communication device is a macro base station, and the second communication device is a relay station, a micro base station, or a user terminal.

2. The method according to claim 1, wherein: the obtaining a downlink beamforming matrix comprises:
   obtaining, by the first communication device and as the downlink beamforming matrix, a downlink transmit beamforming matrix based on the optimized quantity being a signal to leakage plus noise ratio at the second communication device; and
   the using a conjugate transposed matrix of the downlink beamforming matrix as an uplink beamforming matrix for processing uplink signal comprises:
   using, by the first communication device, a conjugate transposed matrix of the downlink transmit beamforming matrix as an uplink receive beamforming matrix for processing uplink signal received from the second communication device.

3. The method according to claim 2, wherein the obtaining, by the first communication device, the downlink transmit beamforming matrix based on a signal to leakage plus noise ratio at the second communication device comprises:
   obtaining, by the first communication device according to a covariance matrix of an additive white Gaussian noise vector at the second communication device and the channel matrix from the first communication device to the second communication device, the downlink transmit beamforming matrix that maximizes the signal to leakage plus noise ratio at the second communication device.

4. The method according to claim 3, wherein the obtaining the downlink transmit beamforming matrix that maximizes the signal to leakage plus noise ratio at the second communication device comprises:
   obtaining, by the first communication device, the downlink transmit beamforming matrix through a following formula:

$$\underset{\vec{W}_i \in C^{M \times d}}{\operatorname{argmax}} SLNR = \underset{\vec{W}_i \in C^{M \times d}}{\operatorname{argmax}} \frac{Tr(\vec{W}_i^H \vec{H}_i^H \vec{H}_i \vec{W}_i)}{Tr\left[\vec{W}_i^H \left(N\sigma_i^2 I + \sum_{j \neq i} \vec{H}_j^H \vec{H}_j\right) \vec{W}_i\right]};$$

wherein: i is a serial number of the second communication devise, and the SLNR is the signal to leakage plus noise ratio at the second communication device; $\vec{W}_i$ is a downlink transmit beamforming matrix to be solved, and $\vec{W}_i \in C^{M \times d}$; $\vec{H}_i$ is a channel matrix from the first communication device to a second communication device i, and $\vec{H}_i \in C^{N \times M}$; $\vec{H}_j$ is a channel matrix from the first communication device to a second communication device j, and $\vec{H}_j \in C^{N \times M}$; $\sigma_i^2$ is a power spectral density of an additive white Gaussian noise of each antenna at the second communication device i, and $\sigma_i^2 I \in C^{M \times M}$; d is the number of data streams sent by the first communication device; M is the number of antennas of the first communication device; and N is the number of antennas of the second communication device i, wherein i and j are integers.

5. The method according to claim 4, wherein: when d=1, the downlink transmit beamforming matrix is an eigenvector corresponding to a maximum generalized eigenvalue of a matrix pair $$\left\{\vec{H}_i^H \vec{H}_i, \left(N\sigma_i^2 I + \sum_{j \neq i} \vec{H}_j^H \vec{H}_j\right)\right\};$$

and when d>1, the downlink transmit beamforming matrix is eigenvectors corresponding to first d maximum generalized eigenvalues of the matrix pair $$\left\{\vec{H}_i^H \vec{H}_i, \left(N\sigma_i^2 I + \sum_{j \neq i} \vec{H}_j^H \vec{H}_j\right)\right\}.$$

6. The method according to claim 1, wherein: the obtaining the downlink beamforming matrix comprises:
   obtaining, by the second communication device and as the downlink beamforming matrix, a downlink receive beamforming matrix based on the optimized quantity being a signal to interference plus noise ratio at the second communication device; and
   the using a conjugate transposed matrix of the downlink beamforming matrix as an uplink beamforming matrix for processing uplink signal comprises:
   using, by the second communication device, a conjugate transposed matrix of the downlink receive beamforming matrix as an uplink transmit beamforming matrix for processing uplink signal sent to the first communication device.

7. The method according to claim 6; wherein the obtaining, by the second communication device, the downlink receive beamforming matrix based on the signal to interference plus noise ratio at the second communication device comprises:

obtaining, by the second communication device according to an interference plus noise covariance matrix at the second communication device and an equivalent channel matrix from the first communication device to the second communication device, the downlink receive beamforming matrix that maximizes the signal to interference plus noise ratio at the second communication device.

8. The method according to claim 7, wherein the obtaining the downlink receive beamforming matrix that maximizes the signal to interference plus noise ratio at the second communication device comprises:

obtaining, by the second communication device, the downlink receive beamforming matrix through a following formula:

$$\max_{\vec{R}_i} SINR = \max_{\vec{R}_i} \frac{\vec{R}_i \vec{H}_i \vec{W}_i \vec{W}_i^H \vec{H}_i^H \vec{R}_i^H}{\vec{R}_i (\vec{Q}_i + \sigma_i^2 I) \vec{R}_i^H}$$

wherein: i is a serial number of the second communication device, and the SINR is the signal to interference plus noise ratio at the second communication device; $(\vec{Q}_i + \sigma_i^2 I)$ is the interference plus noise covariance matrix at the second communication device, and $\sigma_i^2 I \in C^{N \times N}$; $\vec{H}_i \vec{W}_i$ is the equivalent channel matrix from the first communication device to the second communication device, $\vec{W}_i \in C^{M \times d}$, and $\vec{H}_i \in C^{N \times M}$; and $\vec{R}_i$ is a downlink receive beamforming matrix to be solved, and $\vec{R}_i \in C^{d \times N}$; M is the number of antennas of the first communication device; and N is the number of antennas of a second communication device i, wherein i and j are integers.

9. The method according to claim 2, wherein the using the conjugate transposed matrix of the downlink beamforming matrix as the uplink beamforming matrix for processing uplink signal comprises:

in the case of duality of a transceiver filter of the first communication device and duality of a transceiver filter of the second communication device, using the conjugate transposed matrix of the downlink beamforming matrix as the uplink beamforming matrix for processing uplink signal.

10. A device for transmitting signal, comprising:
at least one hardware processor; and
a memory containing instruction which control the at least one hardware processor to implement:
an obtaining module, configured to obtain a downlink transmit beamforming matrix by optimizing a quantity with respect to the beamforming matrix for a channel matrix between a first communication device and a second communication device; and
a processing module, configured to use a conjugate transposed matrix of the downlink transmit beamforming matrix as an uplink receive beamforming matrix for processing uplink signal.

11. The device according to claim 10, wherein:
the device is the first communication device;
the obtaining module is configured to obtain the downlink transmit beamforming matrix based on the quantity being a signal to leakage plus noise ratio at the second communication device; and the processing module is configured to use the conjugate transposed matrix of the downlink transmit beamforming matrix as the uplink receive beamforming matrix for processing uplink signal received from the second communication device.

12. The device according to claim 11, wherein: the obtaining module is configured to obtain, according to a covariance matrix of an additive white Gaussian noise vector at the second communication device and a channel matrix from the first communication device to the second communication device, a downlink transmit beamforming matrix that maximizes the signal to leakage plus noise ratio at the second communication device.

13. The device according to claim 12, wherein the obtaining module is configured to obtain the downlink transmit beamforming matrix through a following formula:

$$\underset{\vec{W}_i \in C^{M \times d}}{\mathrm{argmax}}\ SLNR = \underset{\vec{W}_i \in C^{M \times d}}{\mathrm{argmax}} \frac{Tr(\vec{W}_i^H \vec{H}_i^H \vec{H}_i \vec{W}_i)}{Tr\left[\vec{W}_i^H \left(N\sigma_i^2 I + \sum_{j \neq i} \vec{H}_j^H \vec{H}_j\right) \vec{W}_i\right]};$$

wherein: i is a serial number of the second communication device, and the SLNR is the signal to leakage plus noise ratio at the second communication device; $\vec{W}_i$ is a downlink transmit beamforming matrix to be solved, and $\vec{W}_i \in C^{M \times d}$; $\vec{H}_i$ is a channel matrix from the first communication device to a second communication device i, and $\vec{H}_i \in C^{N \times M}$; $\vec{H}_j$ is a channel matrix from the first communication device to a second communication device j, and $\vec{H}_j \in C^{N \times M}$; $\sigma_i^2$ is a power spectral density of an additive white Gaussian noise of each antenna at the second communication device i, and $\sigma_i^2 I \in C^{M \times M}$; d is the number of data streams sent by the first communication device; M is the number of antennas of the first communication device; and N is the number of antennas of the second communication device i, wherein i and j are integers.

14. The device according to claim 13, wherein: when d=1, the downlink transmit beamforming matrix is an eigenvector corresponding to a maximum generalized eigenvalue of a matrix pair $$\left\{\vec{H}_i^H \vec{H}_i, \left(N\sigma_i^2 I + \sum_{j \neq i} \vec{H}_j^H \vec{H}_j\right)\right\};$$

and when d>1, the downlink transmit beamforming matrix is eigenvectors corresponding to first d maximum generalized eigenvalues of the matrix pair $$\left\{\vec{H}_i^H \vec{H}_i, \left(N\sigma_i^2 I + \sum_{j \neq i} \vec{H}_j^H \vec{H}_j\right)\right\}.$$

15. The device according to claim 11, wherein the processing module is configured to: in the case of duality of a transceiver filter of the first communication device and duality of a transceiver filter of the second communication device, use a conjugate transposed matrix of a downlink beamforming matrix as an uplink beamforming matrix for processing uplink signal.

16. The device according to claim 11, wherein the first communication device is a macro base station, and the second communication device is a relay station, a micro base station, or a user terminal.

17. A device for transmitting signal, comprising:
at least one hardware processor; and
a memory containing instruction which control the at least one hardware processor to implement:
an obtaining module, configured to obtain a downlink receive beamforming matrix by optimizing a quantity with respect to the beamforming matrix for a channel matrix between a first communication device and a second communication device; and
a processing module, configured to use a conjugate transposed matrix of the downlink receive beamforming matrix as an uplink transmit beamforming matrix for processing uplink signal.

18. The device according to claim 17, wherein: the device is the second communication device;
the obtaining module is configured to obtain the downlink receive beamforming matrix based on the quantity being a signal to interference plus noise ratio at the second communication device; and
the processing module uses the conjugate transposed matrix of the downlink receive beamforming matrix as the uplink transmit beamforming matrix for processing uplink signal sent to a first communication device.

19. The device according to claim 18, wherein: the obtaining module is configured to obtain, according to an interference plus noise covariance matrix at the second communication device and an equivalent channel matrix from the first communication device to the second communication device, a downlink receive beamforming matrix that maximizes the signal to interference plus noise ratio at the second communication device.

20. The device according to claim 19, wherein the obtaining module is configured to obtain the downlink receive beamforming matrix through a following formula:

$$\max_{\vec{R}_i} SINR = \max_{\vec{R}_i} \frac{\vec{R}_i \bar{H}_i \bar{W}_i \bar{W}_i^H \bar{H}_i^H \vec{R}_i^H}{\vec{R}_i (\vec{Q}_i + \sigma_i^2 I) \vec{R}_i^H}$$

wherein: i is a serial number of the second communication device, and the SINR is the signal to interference plus noise ratio at the second communication device; $(\vec{Q}_i + \sigma_i^2 I)$ is the interference plus noise covariance matrix at the second communication device, and $\sigma_i^2 I \in C^{N \times N}$; $\bar{H}_i \bar{W}_i$ is the equivalent channel matrix from the first communication device to the second communication device, $\bar{W}_i \in C^{M \times d}$, and $\bar{H}_i \in C^{N \times M}$; and $\vec{R}_i$ is a downlink receive beamforming matrix to be solved, and $\vec{R}_i \in C^{d \times N}$; M is the number of antennas of the first communication device; and N is the number of antennas of a second communication device i, wherein i and j are integers.

21. The device according to claim 18, wherein the processing module is configured to: in the case of duality of a transceiver filter of the first communication device and duality of a transceiver filter of the second communication device, use a conjugate transposed matrix of a downlink beamforming matrix as an uplink beamforming matrix for processing uplink signal.

22. The device according to claim 18, wherein the first communication device is a macro base station, and the second communication device is a relay station, a micro base station, or a user terminal.

* * * * *